United States Patent [19]

Akamatsu et al.

[11] Patent Number: 4,575,474

[45] Date of Patent: Mar. 11, 1986

[54] MAGNETIC RECORDING MEDIUM AND COMPOSITION AND METHOD THEREFOR

[75] Inventors: Shoji Akamatsu; Takeshi Imai, both of Ichihara, Japan

[73] Assignee: Toray Silicone Co., Ltd., Tokyo, Japan

[21] Appl. No.: 557,497

[22] Filed: Dec. 2, 1983

[30] Foreign Application Priority Data

Dec. 8, 1982 [JP] Japan .................. 57-215134

[51] Int. Cl.$^4$ ................................................ G11B 5/70
[52] U.S. Cl. ........................... 428/447; 252/62.54; 360/134; 360/135; 360/136; 427/128; 427/131; 427/387; 428/405; 428/694; 428/900; 428/522
[58] Field of Search .............. 428/694, 447, 695, 900, 428/405, 522, 425.9; 427/128, 131, 132, 387; 360/134–136; 252/62.54

[56] References Cited

U.S. PATENT DOCUMENTS

| | | | |
|---|---|---|---|
| 3,996,407 | 12/1976 | Von Gross | 428/329 |
| 4,169,912 | 10/1979 | Schönafinger | 428/143 |
| 4,177,317 | 12/1979 | Schoenafinger | 428/403 |
| 4,271,234 | 6/1981 | Schönafinger | 428/900 |
| 4,336,310 | 6/1982 | Okuyama | 428/695 |
| 4,434,210 | 2/1984 | Nakajima | 428/694 |

*Primary Examiner*—Ellis P. Robinson
*Attorney, Agent, or Firm*—George A. Grindahl

[57] ABSTRACT

A composition which is useful for preparing a magnetic recording medium is prepared by homogeneously mixing components comprising a magnetic powder, a resin binder and a partial hydrolyzate of an organosilicon compound which contains at least two silicon-bonded hydrolyzable groups and at least one carbon-bonded amino group. When conventionally applied to a substrate to provide the magnetic recording media, the compositions of this invention provide a magnetic layer which is more durably attached to the substrate. Improved magnetic recording media, such as magnetic tapes, are thereby provided.

15 Claims, No Drawings

MAGNETIC RECORDING MEDIUM AND COMPOSITION AND METHOD THEREFOR

BACKGROUND OF THE INVENTION

The present invention concerns a novel magnetic recording medium obtained by coating a novel magnetic layer on a substrate.

Conventional magnetic recording media are obtained by coating a magnetic coating material, which consists principally of a magnetic powder and resin binder, on an appropriate substrate (e.g., polyester films, etc). As necessary, dispersants, antistatic agents, lubricants, organic solvents, etc., are impregnated into the magnetic coating material. In such conventional magnetic media, however, the support and the magnetic layer may separate or the magnetic layer may develop cracks, which are extremely grave problems considering the function of magnetic recording media. Magnetic tape is generally manufactured by slitting a wide magnetic tape to a certain width with a rotary blade, but in such a case, if the adhesion between the support and magnetic layer is inadequate or if the magnetic powder is inadequately bound within the magnetic layer, the magnetic layer may peel off at the edges of the resulting tape or cracks may be produced in the magnetic layer. In response to these problems, the present inventors carried out exhaustive research in order to develop a novel magnetic recording medium which would be free of the shortcomings of prior art magnetic recording media. The present invention was achieved as a result.

BRIEF DESCRIPTION OF THE INVENTION

Briefly stated, the present invention concerns the production of a magnetic recording medium by coating on a substrate a magnetic layer which consists principally of a magnetic powder, a resin binder and a partial hydrolyzate of an organosilicon compound which contains at least two silicon-bonded hydrolyzable groups and at least one carbon-bonded amino group per molecule. The present invention therefore has three aspects.

In a first aspect the present invention relates to a magnetic composition for producing a magnetic recording medium, said magnetic composition comprising a homogeneous mixture of a magnetic powder, a resin binder and a partial hydrolyzate of an organosilicon compound, said organosilicon compound having at least two silicon-bonded hydrolyzable groups and at least one carbon-bonded amino group per molecule.

In a second aspect the present invention relates to an improved magnetic recording medium comprising a magnetic layer adheringly coated onto a substrate, the improvement comprising a magnetic layer comprising a homogeneous mixture of a magnetic powder, a resin binder and partial hydrolyzate of an organosilicon compound, said organosilicon compound having at least two silicon-bonded hydrolyzable groups and at least one carbon-bonded amino group per molecule.

In a third aspect the present invention relates to an improved method for preparing a magnetic recording medium, said method comprising adheringly coating a magnetic composition onto a substrate as a magnetic layer, the improvement comprising using as the magnetic composition a magnetic composition obtained by homogeneously mixing components comprising a magnetic powder, a resin binder and a partial hydrolyzate of an organosilicon compound, said organosilicon compound having at least two silicon-bonded hydrolyzable groups and at least one carbon-bonded amino group per molecule.

DETAILED DESCRIPTION OF THE INVENTION

The magnetic recording media of this invention are conventional as to their substrate material and as to their configuration.

To illustrate further, examples of the substrate material are as follows: synthetic resins such as polyethylene terephthalate, polyamides, polypropylene, polyimides; cellulose acetate; metals and paper. Examples of the configuration are as follows: film, tapes and sheets.

The magnetic layer contains conventional magnetic powders and resin binders. Examples of the magnetic powder are as follows: ferromagnetic iron oxide powders such as $\gamma$-$Fe_2O_3$, $Fe_3O_4$ or powders obtained by mixing these powders with other metals (e.g., Co, Zn, etc.); ferromagnetic chromium dioxide powders such as $CrO_2$ or powders obtained by mixing this with metal atoms such as Sn, Pb, Fe, Co, Ni, Zn, etc.; ferromagnetic alloy powders which consist of Co, Fe, Ni, etc. Examples of the resin binder are as follows: vinyl chloride resins, vinyl chloride-vinyl acetate copolymer resins, vinyl chloride-vinylidene chloride copolymer resins, polyurethane resins, polyamide resins, epoxy resins and cellulose derivatives. Of these resins, the use of vinyl chloride resin or vinyl chloride-vinylidene chloride copolymer resin as the binder maximizes the effectiveness of the present invention because they have a limited adhesion for the substrate and limited cohesion of the magnetic powder.

The magnetic layer further comprises a partial hydrolyzate of an organosilicon compound.

The partial hydrolyzate of the present invention of an organosilicon compound which contains at least two silicon-bonded hydrolyzable groups and at least one carbon-bonded amino group per molcule significantly enhances the adhesion between the magnetic layer and the substrate and the cohesion between the resin binder and the magnetic powder.

Silicon-bonded hydrolyzable groups are well known in the organosilicon art. Any silicon-bonded group, organic or inorganic, which can be replaced by a hydroxyl group through the action of water at room temperature is a silicon-bonded hydrolyzable group.

By carbon-bonded amino group it is meant an amino group that is bonded to a carbon atom which is linked, directly or indirectly, to a silicon atom by a silicon-carbon linkage.

Examples of organosilicon compounds which contain at least two silicon-bonded hydrolyzable groups and at least one carbon-bonded amino group per molecule are as follows: $\gamma$-aminopropyltrimethoxysilane, $\gamma$-aminopropyltriethoxysilane, $\beta$-amino-n-butyltrimethoxysilane, $\gamma$-aminoisobutyltriethoxysilane, N-$\beta$-aminoethyl-$\gamma$-aminopropyltrimethoxysilane, N,N'-bis(triethoxysilylpropyl)ethylenediamine, N-trimethoxysilylpropyltriethyleneimine, $\gamma$-aminopropylmethyldimethoxysilane and these organosilicon compounds in which the methoxy groups or ethoxy groups have been substituted by an N,N-diethylaminoxy group, methyl ethyl ketoxime group, N-methyl-N-cyclohexylamino group, isopropenoxy group or propionoxy group.

The partial hydrolyzate of the organosilicon compound which contains at least two silicon-bonded hydrolyzable groups and at least one carbon-bonded amino group per molecule is produced by hydrolyzing this organosilicon compound in such a way that some of the hydrolyzable groups remain intact. This is accomplished by reacting less-than-stoichiometric amounts of water with the organosilicon compound. For example, 0.10–0.40 equivalents of water may be added to 1 equivalent of the above organosilicon compound. The mixture is agitated at a temperature ranging from room temperature to 90° C. and the residual water and by-products are removed by distillation to obtain a final product. An organic solvent may be used in hydrolysis.

It is desirable that the partial hydrolyzate be produced from an organosilane which contains three silicon-bonded hydrolyzable groups and one to three carbon-bonded amino groups per molecule and preferably from an organosilane which contains three silicon-bonded alkoxy groups and one to three carbon-bonded amino groups per molecule in order to attain the objectives of the present invention.

The magnetic layer may contain a dispersant or lubricant in addition to a magnetic powder, resin binder and the partial hydrolyzate of an organosilicon compound which contains at least two silicon-bonded hydrolyzable groups and at least one carbon-bonded amino group per molecule. Examples of the lubricants are as follows: silicone oils such as dimethylpolysiloxane oil and organic-modified dimethylpolysiloxane oil, graphite powder, molybdenum disulfide powder, polyethylene powder, polytetrafluoroethylene powder, high molecular weight fatty acid esters and fluorocarbon oils.

There are no special restrictions on the ratios at which each component of the magnetic layer are mixed, but it is desirable that 100 parts by weight of magnetic powder be mixed with 5–60 parts by weight of resin binder and 0.5–10 parts by weight and preferably 1–6 parts by weight of the partial hydrolyzate of an organosilicon compound which contains at least two silicon-bonded hydrolyzable groups and at least one carbon-bonded amino group per molecule.

The thickness of the magnetic layer is generally 0.5–20 μm although this also depends on the applications of the magnetic recording media.

To manufacture the magnetic recording medium of the present invention, magnetic powder, a resin binder, the partial hydrolyzate of an organosilicon compound which contains at least two silicon-bonded hydrolyzable groups and at least one carbon-bonded amino group per molecule and other additives as necessary are agitated to homogeneity and the obtained mixture is coated on a substrate and magnetically oriented. After it has been dried, it undergoes a calendering treatment and, finally, the medium is slit to a certain width as required. The resin binder may be dissolved in an appropriate solvent such as methyl isobutyl ketone, methyl ethyl ketone, ethyl acetate, dioxane, cyclohexane, toluene and xylene. Furthermore, the partial hydrolyzate of an organosilicon compound which contains at least two silicon-bonded hydrolyzable groups and at least one carbon-bonded amino group per molecule may be dissolved in an appropriate solvent such as water or high molecular weight alcohols.

In the magnetic recording medium thus obtained, the magnetic layer is not easily separated from the substrate and the magnetic layer is resistant to cracks and abrasive exfoliation; therefore, this magnetic recording medium can be used effectively as an audio tape, video tape, computer tape, floppy disc, etc.

In the following paragraphs, the present invention will be illustrated, but not limited, with demonstrational examples. In each example, "parts" denotes "parts by weight".

EXAMPLE 1

1.0 mol (3.0 equivalents) of $H_2NCH_2CH_2NHCH_2CH_2CH_2Si\text{-}(OCH_3)_3$ and water in the molar quantities (equivalents) reported in the table were charged to a three-neck flask equipped with stirring and the mixture was stirred at 60°–80° C. for 30 minutes. The temperature was then elevated to 90° C. and low boiling substances (i.e., water and methanol) were removed at 5 mm Hg and below. n-Decyl alcohol was added to the flask to obtain partial hydrolyzate solution (a) (solids: 70 wt%).

100 parts of a fine $\gamma\text{-}Fe_2O_3$ powder, 20 parts of a commercial vinyl chloride resin, 200 parts of a 1:1 mixture of methyl ethyl ketone and methyl isobutyl ketone and 2.0 parts of partial hydrolyzate solution (a) were charged to a ball mill and agitated for 50 hours to obtain a magnetic coating material. The resulting magnetic coating material was coated on a polyethylene terephthalate film (thickness: 15μm) to a dry film thickness of 5 μm. After the film had been dried and subjected to a calendering treatment, the film was cut to a width of ½ inch to obtain magnetic tape A.

Partial hydrolyzate solution (b) was prepared by repeating the procedures for partial hydrolyzate solution (a) except that γ-aminopropyltriethoxysilane was used instead of the indicated (aminoethyl)aminopropyltrimethoxysilane. Subsequently, magnetic tape B was manufactured under the same conditions as in the production of magnetic tape A except that partial hydrolyzate solution (b) was substituted for partial hydrolyzate solution (a).

For comparison, magnetic tape C was manufactured under the same conditions as in the production of magnetic tape A except that partial hydrolyzate solution (a) was substituted by 1.4 parts of $H_2NCH_2CH_2NHCH_2CH_2CH_2Si(OCH_3)_3$.

As another comparison example, magnetic tape D was manufactured under the same conditions as in the production of magnetic tape A except that partial hydrolyzate solution (a) was omitted.

Magnetic tapes A through D were evaluated by the following method. A transparent, pressure-sensitive tape (width: ½ inch) was applied to the surface of the magnetic layer of each magnetic tape (approximately 10 cm), the tape was firmly rubbed with a finger and, after it had been securely adhered, one edge of the pressure sensitive tape was peeled off in 1 to 2 seconds. The peeled status of the magnetic layer was evaluated according to the following four level scale.

No peeling of the magnetic layer whatsoever: I
Little peeling of the magnetic layer: II
Visible peeling of the magnetic layer: III
Significant peeling of the magnetic layer: IV
The peeled status of each tape is shown in the table.

TABLE

| | Peeled Status of the Magnetic Layers of Magnetic Tapes | | |
|---|---|---|---|
| | Mols (equivalents) of water added in the production of the partial hydrolyzate | | |
| Magnetic Tape | 0.5 mol (0.5 eq.) | 0.7 mol (0.7 eq.) | 1.0 mol (1.0 eq.) |
| (A) Invention | I | I | I |

TABLE-continued

| | Peeled Status of the Magnetic Layers of Magnetic Tapes | | |
|---|---|---|---|
| | Mols (equivalents) of water added in the production of the partial hydrolyzate | | |
| Magnetic Tape | 0.5 mol (0.5 eq.) | 0.7 mol (0.7 eq.) | 1.0 mol (1.0 eq.) |
| (B) Invention | I | I | I |
| (C) Comparison | II to III* | | |
| (D) Comparison | IV* | | |

*No water

EXAMPLE 2

1.0 mol (3.0 equivalents) each of the following aminoalkyltrimethoxysilanes was hydrolyzed with 0.70 mol (0.70 equivalents) of water and, after low boiling substances had been removed, n-decyl alcohol was added to provide the respective partial hydrolyzate solutions (solids: 70 wt%, the conditions of partial hydrolysis and the conditions under which the low boiling substances were removed were identical to those in Example 1).

Silane (a) $NH_2CH_2CH_2NHCH_2CH_2CH_2Si(OCH_3)_3$
Silane (b) $NH_2CH_2CH_2CH_2Si(OCH_3)_3$
Silane (c) $NH_2CH_2CH_2NHCH_2CH_2NHCH_2CH_2CH_2Si(OCH_3)_3$ For each of the partial hydrolyzate solutions, magnetic tapes were manufactured under conditions identical to those in Example 1 (except that the quantity of partial hydrolyzate added in the dried/cohered magnetic layer was varied over 1.0, 1.5, 2.0 or 3.0 wt%). The resulting tapes were then evaluated under the same conditions as in Example 1. All 12 tapes showed no peeling of the magnetic layer whatsoever.

EXAMPLE 3

Using the procedures of Example 1 with the exception that the vinyl chloride resin of Example 1 was replaced by a vinyl chloride-vinyl acetate copolymer resin (copolymerization molar ratio: 94:6), magnetic tape E was manufactured using partial hydrolyzate solution (a) and magnetic tape F was manufactured from partial hydrolyzate solution (b). Subsequently, the peeled status of the magnetic layer was examined under the same consitions as in Example 1. There was no peeling of the magnetic layer whatsoever in either case. Neither magnetic tape E nor magnetic tape F produced cracks even after having been bent at 180° for a total of 50 times.

EXAMPLE 4

Using the procedures of Example 1 with the exception that the polyethylene terephthalate film of Example 1 was replaced by a triacetate film (thickness: 25 μm), magnetic tape G was manufactured from partial hydrolyzate solution (a) and magnetic tape H was manufactured from partial hydrolyzate solution (b). Subsequently, the peeled status of the magnetic layer was examined under the same conditions as in Example 1. There was no peeling of the magnetic layer whatsoever in either case.

That which is claimed is:

1. A magnetic composition for producing a magnetic recording medium, said magnetic composition comprising a homogeneous mixture of a magnetic powder, a resin binder and a partial hydrolyzate of an organosilicon compound, said organosilicon compound having at least two silicon-bonded hydrolyzable groups and at least one carbon-bonded amino group per molecule.

2. A composition according to claim 1 which comprises, for every 100 parts by weight of magnetic powder, from 5 to 60 parts by weight of resin binder and from 0.5 to 10 parts by weight of partial hydrolyzate of organosilicon compound.

3. A composition according to claim 2 wherein the organosilicon compound is a silane which contains three silicon-bonded alkoxy groups and from 1 and 3 carbon-bonded amino groups per molecule.

4. A composition according to claim 3 wherein the organosilicon compounds has the formula $(CH_3O)_3SiCH_2CH_2CH_2NHCH_2CH_2NH_2$.

5. A composition according to claim 4 wherein the resin binder is selected from the group consisting of vinyl chloride polymer resins and vinyl chloride-vinylidene chloride copolymer resin.

6. In a magnetic recording medium comprising a magnetic layer adheringly coated onto a substrate, the improvement comprising a magnetic layer comprising a homogeneous mixture of a magnetic powder, a resin binder and a partial hydrolyzate of an organosilicon compound, said organosilicon compound having at least two silicon-bonded hydrolyzable groups and at least one carbon-bonded amino group per molecule.

7. An improved magnetic recording medium according to claim 6 wherein the magnetic layer comprises, for every 100 parts by weight of the magnetic powder, from 5 to 60 parts by weight of resin binder and from 0.5 to 10 parts by weight of the partial hydrolyzate of organosilicon compound.

8. An improved magnetic recording medium according to claim 7 wherein the partial hydrolyzate is prepared from an organosilicon compound having three silicon-bonded alkoxy groups and from 1 to 3 carbon-bonded amino groups per molecule.

9. An improved magnetic recording medium according to claim 8 wherein the organosilicon compound has the formula $(CH_3O)_3SiCH_2CH_2CH_2NHCH_2CH_2NH_2$.

10. An improved magnetic recording medium according to claim 9 wherein the resin binder is selected from the group consisting of vinyl chloride polymer resin and vinyl chloride-vinylidene chloride copolymer resin.

11. In a method for preparing a magnetic recording medium, said method comprising adheringly coating a magnetic composition onto a substrate as a magnetic layer, the improvement comprising using as the magnetic composition a magnetic composition obtained by homogeneously mixing components comprising a magnetic powder, a resin binder and a partial hydrolyzate of an organosilicon compound said organosilicon compound having at least two silicon-bonded hydrolyzable groups and at least one carbon-bonded amino group per molecule.

12. An improved method according to claim 11 wherein, with every 100 parts by weight of magnetic powder, there is mixed from 5 to 60 parts by weight of the resin binder and from 0.5 to 10 parts by weight of the partial hydrolyzate of organosilicon compound.

13. An improved method according to claim 12 wherein the partial hydrolyzate is prepared from an organosilicon compound having three silicon-bonded alkoxy groups and from 1 to 3 carbon-bonded amino groups per molecule.

14. An improved method according to claim 13 wherein the organosilicon compound has the formula $(CH_3O)_3SiCH_2CH_2CH_2NHCH_2CH_2NH_2$.

15. An improved method according to claim 14 wherein the resin binder is selected from the group consisting of vinyl chloride polymer resin and vinyl chloride-vinylidene chloride copolymer resin.

* * * * *